(12) United States Patent
Choi et al.

(10) Patent No.: US 10,286,885 B2
(45) Date of Patent: May 14, 2019

(54) ELECTRIC BRAKE SYSTEM

(71) Applicant: MANDO CORPORATION, Gyeonggi-do (KR)

(72) Inventors: Seong-Ho Choi, Gyeonggi-do (KR); In-Wook Jeon, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 77 days.

(21) Appl. No.: 15/368,500

(22) Filed: Dec. 2, 2016

(65) Prior Publication Data

US 2017/0158179 A1    Jun. 8, 2017

(30) Foreign Application Priority Data

Dec. 4, 2015  (KR) .......................... 10-2015-0172060

(51) Int. Cl.
*B60T 13/68*    (2006.01)
*B60T 8/40*    (2006.01)
(Continued)

(52) U.S. Cl.
CPC ............ *B60T 8/4068* (2013.01); *B60T 7/042* (2013.01); *B60T 8/4081* (2013.01); *B60T 13/686* (2013.01); *B60T 13/745* (2013.01)

(58) Field of Classification Search
CPC .... B60T 8/4068; B60T 8/4081; B60T 8/4086; B60T 8/409; B60T 13/745
See application file for complete search history.

(56) References Cited

U.S. PATENT DOCUMENTS 6,517,170 B1 * 2/2003 Hofsaess ................. B60T 7/042
                                                              303/10
9,868,426 B2 * 1/2018 Feigel .................... B60T 11/224
(Continued)

FOREIGN PATENT DOCUMENTS

CN    103241233    8/2013
CN    103786707    5/2014
(Continued)

OTHER PUBLICATIONS

Office Action dated Nov. 2, 2018 for Chinese Patent Application No. 201611181801.8 and its English machine translation by Global Dossier.

*Primary Examiner* — Bradley T King
(74) *Attorney, Agent, or Firm* — Ladas & Parry, LLP (57) ABSTRACT

An electric brake system comprising: a master cylinder configured to a reservoir storing oil therein and configured to generate hydraulic pressure according to a pedal effort of a brake pedal; a cut valve installed at a backup flow path connecting the master cylinder to a wheel cylinder; a simulation device including a simulation chamber connected to the master cylinder at a front end of the cut valve to provide a reaction force according to the pedal effort of the brake pedal, a simulation valve provided at a flow path connecting the master cylinder to the simulation chamber; a hydraulic pressure supply device configured to operate in response to an electrical signal of a pedal displacement sensor sensing a displacement of the brake pedal, and a damping member provided at a flow path connecting the hydraulic pressure chamber to the front end of the cut valve, wherein the damping member delivers a pressure pulsation generated in the hydraulic pressure chamber to the brake pedal in an anti-lock brake system (ABS) mode.

19 Claims, 7 Drawing Sheets

(51) Int. Cl.
*B60T 7/04* (2006.01)
*B60T 13/74* (2006.01)

(56) References Cited

U.S. PATENT DOCUMENTS

| | | | |
|---|---|---|---|
| 2006/0202551 A1* | 9/2006 | Gottwick | B60T 8/4081 |
| | | | 303/116.1 |
| 2013/0239566 A1* | 9/2013 | Kim | B60T 13/142 |
| | | | 60/534 |
| 2014/0028084 A1 | 1/2014 | Biller et al. | |
| 2015/0035353 A1 | 2/2015 | Drumm | |
| 2015/0344014 A1* | 12/2015 | Knechtges | B60T 7/042 |
| | | | 701/70 |
| 2016/0001754 A1* | 1/2016 | Kim | B60T 8/4068 |
| | | | 303/87 |
| 2016/0221553 A1* | 8/2016 | Watanabe | B60T 7/042 |
| 2017/0158180 A1* | 6/2017 | Kim | B60T 7/042 |
| 2017/0313294 A1* | 11/2017 | Ishino | B60T 13/662 |

FOREIGN PATENT DOCUMENTS

| | | | |
|---|---|---|---|
| CN | 105026230 | | 11/2015 |
| KR | 2003-369518 | * | 2/2002 |
| WO | 2015/041141 | | 3/2015 |

* cited by examiner

ELECTRIC BRAKE SYSTEM

This application claims the benefit of Korean Patent Application No. 2016-0172060, filed on Dec. 4, 2015 in the Korean Intellectual Property Office, the disclosure of which is incorporated herein by reference.

BACKGROUND

1. Field

Embodiments of the present disclosure relate to an electric brake system, and more particularly, to an electric brake system capable of sensing a pressure pulsation according to a request of a driver while an anti-lock brake system (ABS) operates.

2. Description of the Related Art

A brake system for braking is necessarily mounted on a vehicle, and a variety of systems for providing stronger and more stable braking have been proposed recently.

For example, there are brake systems including an anti-lock brake system (ABS) for preventing a wheel from sliding while braking, a brake traction control system (BTCS) for preventing a driving wheel from slipping when a vehicle is unintentionally or intentionally accelerated, an electronic stability control (ESC) system for stably maintaining a driving state of a vehicle by combining an ABS with a traction control to control hydraulic pressure of a brake, and the like.

Generally, an electric brake system includes a hydraulic pressure supply device which receives a braking intent of a driver in the form of an electrical signal from a pedal displacement sensor which senses a displacement of a brake pedal when the driver steps on the brake pedal and then supplies hydraulic pressure to a wheel cylinder.

An electric brake system configured with such a hydraulic pressure supply device is disclosed in European Registered Patent No. EP 2 520 473. According to the disclosure in that document, the hydraulic pressure supply device is configured such that a motor is operated according to a pedal effort of a brake pedal to generate braking pressure. At this point, the braking pressure is generated by converting a rotational force of the motor into a rectilinear movement to pressurize a piston.

Also, the electric brake system includes a simulation device capable of providing a driver with a reaction force according to the pedal effort of the brake pedal. At this point, the simulation device is connected to an oil reservoir, and a simulation valve is installed at an oil flow path which connects the simulation device to the oil reservoir. The simulation valve is provided to be blocked when the electric brake system operates abnormally and to deliver hydraulic pressure discharged from a master cylinder to the wheel cylinder such that stable braking may be performed.

Such an electric brake system has a structure in which a reaction force according to the pedal effort of the brake pedal is provided through the simulation device and the hydraulic pressure is delivered to a wheel cylinder through the hydraulic pressure supply device so that a pressure pulsation, which is generated during an ABS control, is not delivered to a driver. Therefore, although the driver requests to deliver the pressure pulsation thereto during the ABS control, a cut valve provided at a flow path, which connects a master cylinder to the wheel cylinder, should be maintained in a blocked state for stable braking so that there is a problem in that the pressure pulsation is not delivered to the driver.

PRIOR ART DOCUMENT (Patent Document) European Registered Patent No. EP 2 520 473 A1 (Honda Motor Co., Ltd.), Nov. 7, 2012.

SUMMARY

Therefore, it is an aspect of the present disclosure to provide an electric brake system capable of delivering a pressure pulsation generated while an ABS operates to a driver.

Additional aspects of the disclosure will be set forth in part in the description which follows and, in part, will be obvious from the description, or may be learned by practice of the disclosure.

In accordance with one aspect of the present invention, there is provided an electric brake system comprising: a master cylinder configured to a reservoir storing oil therein and configured to generate hydraulic pressure according to a pedal effort of a brake pedal; a cut valve installed at a backup flow path connecting the master cylinder to a wheel cylinder; a simulation device including a simulation chamber connected to the master cylinder at a front end of the cut valve to provide a reaction force according to the pedal effort of the brake pedal and configured to store the oil therein, and a simulation valve provided at a flow path connecting the master cylinder to the simulation chamber, or connecting the simulation chamber to the reservoir; a hydraulic pressure supply device configured to operate in response to an electrical signal of a pedal displacement sensor sensing a displacement of the brake pedal, and deliver hydraulic pressure, which is generated by pressurizing a hydraulic pressure chamber connected to the reservoir to store oil, to the wheel cylinder; and a damping member provided at a flow path connecting the hydraulic pressure chamber to the front end of the cut valve, wherein the damping member delivers a pressure pulsation generated in the hydraulic pressure chamber to the brake pedal in an anti-lock brake system (ABS) mode.

Also, one side of the damping member is connected to the hydraulic pressure chamber, and the other side thereof is connected to the simulation chamber.

Also, the simulation valve is provided to open a flow path connecting the simulation chamber to the reservoir in a normal mode, and to close the flow path connecting the simulation chamber to the reservoir in an abnormal mode, and is selectively open or closed in the ABS mode to deliver a required pressure pulsation.

Also, an electric brake system further comprising: a hydraulic control unit including first and second hydraulic circuits connected to the hydraulic pressure supply device through a flow path and configured to receive hydraulic pressure discharged from the hydraulic pressure supply device to control a flow of the hydraulic pressure being delivered to the wheel cylinder provided at each of wheels; and an electronic control unit configured to control the motor and valves on the basis of hydraulic pressure information and displacement information of the brake pedal, wherein the master cylinder has a first hydraulic port connected to the first hydraulic circuit, and a second hydraulic port connected to the second hydraulic circuit, and wherein the hydraulic pressure supply device is configured such that the motor is operated in response to the electrical signal output from the pedal displacement sensor and the hydraulic pressure is generated by converting a rotational force of the motor into a rectilinear movement.

Also, the hydraulic control unit includes: first to fourth inlet valves respectively provided at an upstream side of the wheel cylinder and configured to control the hydraulic pressure flowing to the wheel cylinder installed at each of the wheels; first to fourth dump valves configured to respectively control a flow of hydraulic pressure discharged from the wheel cylinder; and first and second balance valves respectively disposed between the first to fourth inlet valves and first to fourth dump valves, wherein the first balance valve is connected to two inlet valves among the first to fourth inlet valves and the second balance valve is connected to the remaining two inlet valves.

Also, one of the two inlet valves connected to each other through the first balance valve and one of the two inlet valves connected to each other through the second balance valve are open so that the hydraulic pressure is delivered to the wheel cylinder installed at each of the wheels.

Also, the first to fourth inlet valves are configured with normally closed type solenoid valves that are usually closed and are open when an opening signal is received.

Also, the first to fourth dump valves are configured with normally closed type solenoid valves that are usually closed and are open when an opening signal is received.

Also, the first and second balance valves are configured with normally opened type solenoid valves that are usually open and are closed when a closing signal is received from the electronic control unit.

Also, an electric brake system further comprising: a first backup flow path configured to connect the first hydraulic port to the first balance valve so as to directly supply oil to the wheel cylinder when the electric brake system operates abnormally; a second backup flow path configured to connect the second hydraulic port to the second balance valve; a first cut valve provided at the first backup flow path and configured to control a flow of the oil; and a second cut valve provided at the second backup flow path and configured to control a flow of the oil.

Also, the first and second cut valves are configured with normally opened type solenoid valves that are usually open and are closed when a closing signal is received from the electronic control unit.

Also, the hydraulic pressure supply device includes: a motor configured to generate a rotational force in response to the electrical signal of the pedal displacement sensor; a power conversion unit configured to convert the rotational force of the motor into a rectilinear movement; a hydraulic piston connected to the power conversion unit and configured to perform a rectilinear movement; a hydraulic pressure chamber provided to slide the hydraulic piston therein and connected to the first and second hydraulic circuits though the hydraulic flow path; and a hydraulic spring provided inside the hydraulic pressure chamber and configured to elastically support the hydraulic piston, wherein the hydraulic pressure chamber is configured to be connected to the reservoir through an oil port and to receive the oil.

Also, a communicating hole is formed to be connected to the reservoir at an outlet side of the hydraulic pressure chamber, and a check valve provided at a flow path connected to the communicating hole and the reservoir and configured to allow the oil to flow from the reservoir to the hydraulic pressure chamber and block the oil from flowing from the hydraulic pressure chamber to the reservoir.

Also, the simulation valve and a simulation check valve are provided in parallel at a flow path to which a rear end part of the simulation chamber of the simulation device and the reservoir are connected.

Also, the simulation valve is configured with a normally closed type solenoid valve that is usually closed and is open when an opening signal is received.

DETAILED DESCRIPTION

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein and may be implemented in other forms. In the drawings, some portions not related to the description will be omitted and will not be shown in order to clearly describe the present disclosure, and also sizes of components may be somewhat exaggerated to help understanding.

Figure 1:
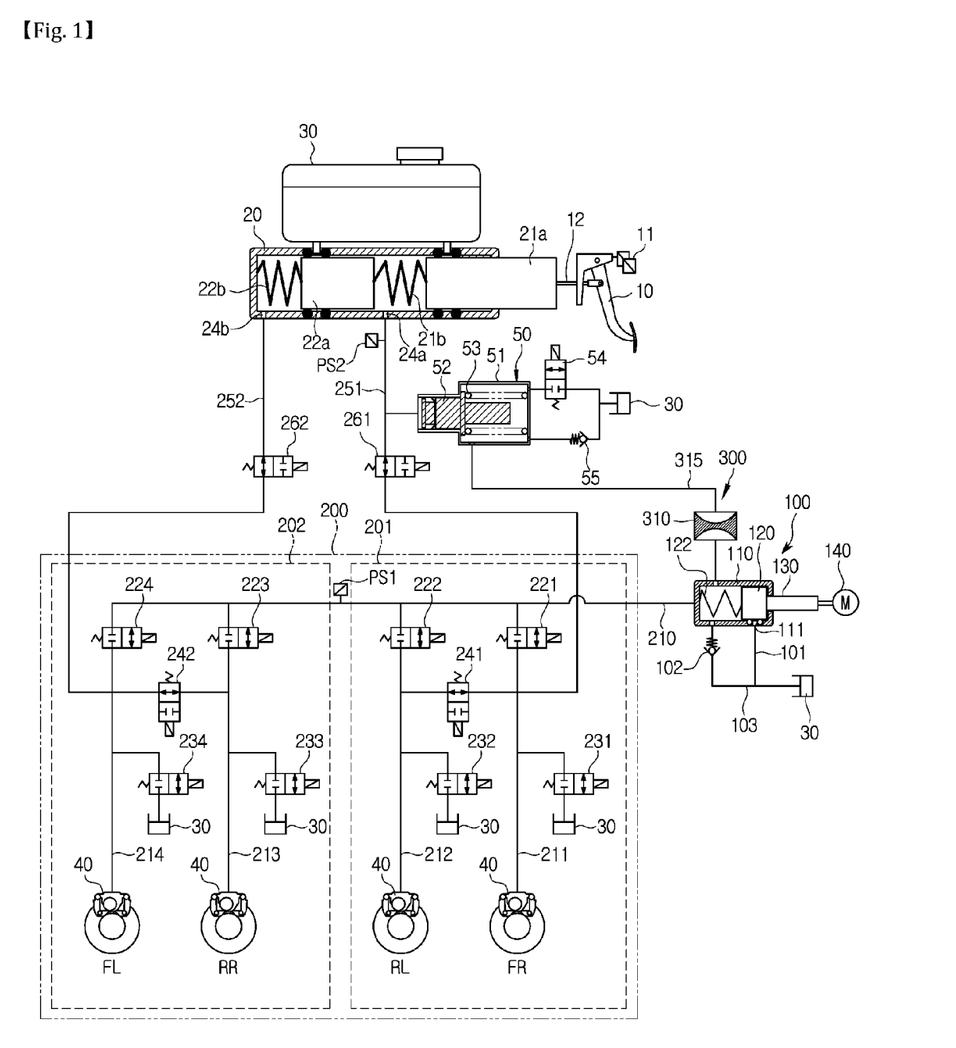
FIG. 1 is a hydraulic circuit diagram illustrating a non-braking state of an electric brake system according to one preferred embodiment of the present disclosure.

FIG. 1 is a hydraulic circuit diagram illustrating a non-braking state of an electric brake system according to one preferred embodiment of the present disclosure.

Referring to FIG. 1, the electric brake system generally includes a master cylinder 20 for generating hydraulic pressure, a reservoir 30 coupled to an upper part of the master cylinder 20 to store oil, an input rod 12 for pressurizing the master cylinder 20 according to a pedal effort of a brake pedal 10, a wheel cylinder 40 for receiving the hydraulic pressure to perform braking of each of wheels RR, RL, FR, and FL, a pedal displacement sensor 11 for sensing a displacement of the brake pedal 10, and a simulation device 50 for providing a reaction force according to the pedal effort of the brake pedal 10.

The master cylinder 20 may be configured to include at least one chamber to generate hydraulic pressure. As shown in the drawings, the master cylinder 20 may be configured to include two chambers 25*a* and 25*b*, a first piston 21*a* and a second piston 22*a* may be provided at the two chambers 25*a* and 25*b*, respectively, and the first piston 21*a* and the input rod 12 may come into contact with each other. The reason for providing the two chambers in the master cylinder 20 is that it is for securing safety even when one of the two chambers fails. For example, a first chamber of the two chambers is connected to a front right wheel FR and a rear left wheel RL and the remaining chamber is connected to a front left wheel FL and a rear right wheel RR. Alternatively, the first chamber of the two chambers may be connected to two front wheels FR and FL and the remaining chamber may be connected to two rear wheels RR and RL. As described above, the reason for independently configuring the two chambers is that braking of a vehicle may be possible even when one of the two chambers fails. First and second hydraulic ports 24a and 24b are formed at the master cylinder 20 and at which hydraulic pressure is respectively discharged from the two chambers.

Also, a first spring 21b is provided between the first piston 21a and the second piston 22a of the master cylinder 20, and a second spring 22b is provided between the second piston 22a and an end of the master cylinder 20. That is, the first spring 21b and the second spring 22b are provided at the two chambers, respectively, to store an elastic force when the first piston 21a and the second piston 22a are compressed. When a force pushing the first piston 21a is less than the elastic force, the elastic force pushes the first and second pistons 21a and 22a and returns the first and second pistons 21a and 22a to their original positions, respectively.

Meanwhile, the input rod 12 pressurizing the first piston 21a of the master cylinder 20 comes into close contact with the first piston 21a so that there is no gap between the master cylinder 20 and the input rod 12. That is, when the brake pedal 10 is stepped on, the master cylinder 20 may be directly pressurized without a pedal dead stroke section.

The simulation device 50 is connected to a first backup flow path 251, which will be described below, to provide a reaction force according to the pedal effort of the brake pedal 10.

As shown in the drawing, the simulation device 50 includes a simulation chamber 51 provided to store oil therein discharged from the first hydraulic port 24a of the master cylinder 20, a reaction force piston 52 provided inside the simulation chamber 51, a pedal simulator provided with a reaction force spring 53 elastically supporting the reaction force piston 52, and a simulation valve 54 connected to a rear end part of the simulation chamber 51. At this point, the reaction force piston 52 and the reaction force spring 53 are respectively installed to have a predetermined range of displacement within the simulation chamber 51 by oil flowing therein.

Meanwhile, the reaction force spring 53 shown in the drawing is merely one embodiment capable of providing an elastic force to the reaction force piston 52, and thus it may include numerous embodiments capable of storing an elastic force through shape deformation. As one example, the reaction force spring 53 includes a variety of members which are configured with a material including rubber and the like and have a coil or plate shape, thereby being able to store an elastic force.

The simulation valve 54 may be provided at a flow path connecting a rear end of the simulation chamber 51 to the reservoir 30. That is, an inlet of the simulation chamber 51 is connected to the master cylinder 20, the rear end of the simulation chamber 51 is connected to the simulation valve 54, and the simulation valve 54 is connected to the reservoir 30. Therefore, when the reaction force piston 52 is returned, oil inside the reservoir 30 may flow through the simulation valve 54 so that an inside of the simulation chamber 51 may be entirely filled with the oil.

Such a simulation valve 54 is configured with a normally closed type solenoid valve that usually maintains a closed state. When the driver steps on the brake pedal 10, the simulation valve 54 is opened to deliver brake oil to the simulation chamber 51.

Also, a simulation check valve 55 may be installed to be connected in parallel with the simulation valve 54 between the simulation device 50 and the reservoir 30.

The simulation check valve 55 may be configured to allow the oil inside the reservoir 30 to flow toward only the simulation chamber 51. That is, the reaction force piston 52 of the pedal simulator compresses the reaction force spring 53 so that the oil inside the simulation chamber 51 is delivered to the reservoir 30 through the simulation valve 54.

Therefore, since the inside of the simulation chamber 51 is in a state in which the oil is filled therein, friction of the reaction force piston 52 is minimized when the simulation device 50 is operated, and thus durability of the simulation device 50 is improved and also a configuration for blocking introduction of foreign materials from the outside is provided.

In addition, when the pedal effort of the brake pedal 10 is released, the oil is provided inside the simulation chamber 51 through the simulation check valve 55 to ensure a rapid return of pressure of the pedal simulator.

The electric brake system according to one embodiment of the present disclosure includes a hydraulic pressure supply device 100 which is mechanically operated by receiving a braking intent of the driver in the form of an electrical signal from the pedal displacement sensor 11 sensing a displacement of the brake pedal 10, a hydraulic control unit 200 configured with first and second hydraulic circuits 201 and 202, each of which is provided with two wheels and controls a flow of hydraulic pressure delivered to the wheel cylinder 40 that is provided at each of the wheels RR, RL, FR, and FL, a first cut valve 261 provided at the first backup flow path 251 connecting the first hydraulic port 24a to the first hydraulic circuit 201 to control a flow of hydraulic pressure, a second cut valve 262 provided at a second backup flow path 252 connecting the second hydraulic port 24b to the second hydraulic circuit 202 to control a flow of hydraulic pressure, an electronic control unit (not shown) for controlling the hydraulic pressure supply device 100 and valves 54, 221, 222, 223, 224, 231, 232, 241, 242, 261, and 262 on the basis of hydraulic pressure information and pedal displacement information, and a damping member 300 provided at a flow path connecting the simulation device 50 to the hydraulic pressure supply device 100.

The hydraulic pressure supply device 100 includes a hydraulic pressure chamber 110 in which a predetermined space is formed to receive and store oil therein, a hydraulic piston 120 and a hydraulic spring 122 provided inside the hydraulic pressure chamber 110, a motor 140 for generating a rotational force in response to an electrical signal of the pedal displacement sensor 11, and a power conversion unit 130 for converting a rotational movement of the motor 140 into a rectilinear movement to rectilinearly move the hydraulic piston 120. At this point, the reservoir 30 and the hydraulic pressure chamber 110 are connected to each other by an oil flow path 103 to supply the oil to the hydraulic pressure chamber 110. Here, a signal sensed by the pedal displacement sensor 11 is transmitted to the electronic control unit (ECU) (not shown), and the ECU controls the motor 140 and the valves provided in the electric brake system of the present disclosure, which will be described below. An operation of controlling a plurality of valves according to a displacement of the brake pedal 10 will be described below.

The hydraulic pressure chamber 110 as described above is connected to the reservoir 30 by the oil flow path 103, and receives and stores the oil therein. As described above, the hydraulic piston 120 and the hydraulic spring 122 elastically supporting the hydraulic piston 120 are provided in the hydraulic pressure chamber 110. At this point, the hydraulic pressure generated by a pressurization of the hydraulic piston 120 is delivered to the wheel cylinder 40 installed at each of the wheels RR, RL, FR, and FL through a main hydraulic flow path 210.

The hydraulic piston 120 pressurizing the hydraulic pressure chamber 110 is connected to the power conversion unit 130, which converts a rotational force of the motor 140 into a rectilinear movement, and slides inside the hydraulic pressure chamber 110.

The power conversion unit 130 is a device for converting a rotational force into a rectilinear movement and may be configured with a ball screw nut assembly. For example, the power conversion unit 130 may be configured with a screw which is integrally formed with a rotational shaft (not shown) of the motor 140, and a ball nut which is screw-coupled to the screw in a state in which a rotation of the ball nut is restricted to perform a rectilinear movement according to a rotation of the screw. That is, the screw serves as the rotational shaft of the motor 140 and also to linearly move the ball nut. At this point, the hydraulic piston 120 is connected to the ball nut of the power conversion unit 130 to pressurize the hydraulic pressure chamber 110 by the rectilinear movement of the ball nut, and the hydraulic spring 122 serves to return the hydraulic piston 120 to its original position while the ball nut is returned to its original position.

Meanwhile, although not shown in the drawing, the power conversion unit 130 may be configured with a ball nut which is rotated by receiving a rotational force from the rotational shaft of the motor 140, and a screw which is screw-coupled to the ball nut in a state in which a rotation of the screw is restricted to perform a rectilinear movement according to a rotation of the ball nut. Such a ball screw nut assembly is a device for converting a rotational movement into a rectilinear movement, and a structure thereof is generally known in the art so that a detailed description thereof will be omitted. Also, it should be understood that the power conversion unit 130 according to the present disclosure may employ any structure capable of converting a rotational movement into a rectilinear movement in addition to the structure of the ball screw nut assembly.

The motor 140 is an electric motor for generating a rotational force in response to a signal output from the ECU, and generates the rotational force in a forward or backward direction by the ECU. At this point, a precise control may be realized by controlling a rotational angle or a speed through the motor 140. Since such a motor 140 is generally known in the art, a detailed description thereof will be omitted.

Additionally, a check valve 102 is installed at the oil flow path 103 to prevent hydraulic pressure of the hydraulic pressure chamber 110 from back flowing. The check valve 102 serves to prevent the hydraulic pressure of the hydraulic pressure chamber 110 from back flowing, and also causes the oil to be suctioned and stored in the hydraulic pressure chamber 110 while the hydraulic piston 120 is returned.

When the electric brake system provided with the above described hydraulic pressure supply device 100 is used, in a process in which the hydraulic piston 120 is returned and thus the oil is suctioned into the hydraulic pressure chamber 110, it may be configured to prevent a case in which pressure inside the hydraulic pressure chamber 110 is not released to atmospheric pressure. For example, a cut off hole 111 is formed at the hydraulic pressure chamber 110, and a connection flow path 101 is formed between the hydraulic pressure chamber 110 and the oil flow path 103 to connect the cut off hole 111 to the oil flow path 103. At this point, the cut off hole 111 is formed at a position corresponding to an initial position of the hydraulic piston 120. Consequently, when the hydraulic piston 120 is returned, the hydraulic pressure chamber 110 is automatically connected to the reservoir 30 through the connection flow path 101 so that the pressure inside the hydraulic pressure chamber 110 is returned to the atmospheric pressure.

The hydraulic control unit 200 is configured with the first hydraulic circuit 201 and the second hydraulic circuit 202, each of which receives hydraulic pressure to control two wheels. As shown in the drawing, the first hydraulic circuit 201 may control the front right wheel FR and the rear left wheel RL, and the second hydraulic circuit 202 may control the front left wheel FL and the rear right wheel RR. The wheel cylinder 40 is installed at each of the wheels FR, FL, RR, and RL, and performs braking by receiving the hydraulic pressure. That is, the hydraulic control unit 200 receives the hydraulic pressure from the hydraulic pressure supply device 100 through the main hydraulic flow path 210 connected to the first and second hydraulic circuits 201 and 202, and the first and second hydraulic circuits 201 and 202 include a plurality of valves 221, 222, 223, 224, 231, 232, 233, 234, 241, and 242 to control a flow of the hydraulic pressure.

The first hydraulic circuit 201 includes first and second inlet valves 221 and 222 connected to the main hydraulic flow path 210 and configured to control the hydraulic pressure delivered to the wheel cylinders 40, first and second dump valves 231 and 232 configured to control a flow of oil discharged from the wheel cylinders 40 provided in the first hydraulic circuit 201, and a first balance valve 241 configured to connect and block between the two wheel cylinders 40 to and from each other to which the first inlet valve 221 and the second inlet valve 222 are connected. More particularly, the first inlet valve 221 is provided at a first hydraulic flow path 211 connected to the main hydraulic flow path 210 and the front right wheel FR, and the second inlet valve 222 is provided at a second hydraulic flow path 212 connected to the main hydraulic flow path 210 and the rear left wheel RL. The first dump valve 231 is connected to the first hydraulic flow path 211 and controls hydraulic pressure discharged from the wheel cylinder 40 of the front right wheel FR, and the second dump valve 232 is connected to the second hydraulic flow path 212 and controls hydraulic pressure discharged from the wheel cylinder 40 of the rear left wheel RL. The first balance valve 241 is provided at a flow path connecting the first hydraulic flow path 211 to the second hydraulic flow path 212, and serves to connect and block the first and second hydraulic flow paths 211 and 212 to and from each other according to opening and closing operations.

The second hydraulic circuit 202 includes third and fourth inlet valves 223 and 224 connected to the main hydraulic flow path 210 and configured to control hydraulic pressure delivered to the wheel cylinders 40, third and fourth dump valves 233 and 234 configured to control a flow of oil discharged from the wheel cylinders 40 provided in the second hydraulic circuit 202, and a second balance valve 242 configured to connect and block between the two wheel cylinders 40 to and from each other to which the third inlet valve 223 and the fourth inlet valve 224 are connected. More particularly, the third inlet valve 223 is provided at a third hydraulic flow path 213 connected to the main hydraulic flow path 210 and the rear right wheel RR, and the fourth inlet valve 224 is provided at a fourth hydraulic flow path 214 connected to the main hydraulic flow path 210 and the front left wheel FL. The third dump valve 233 is connected to the third hydraulic flow path 213 and controls hydraulic pressure discharged from the wheel cylinder 40 of the rear right wheel RR, and the fourth dump valve 234 is connected to the fourth hydraulic flow path 214 and controls hydraulic pressure discharged from the wheel cylinder 40 of the front left wheel FL. The second balance valve 242 is provided at a flow path connecting the third hydraulic flow path 213 to the fourth hydraulic flow path 214, and serves to connect and block the third and fourth hydraulic flow paths 213 and 214 to and from each other according to opening and closing operations.

The opening and closing operations of each of the first to fourth inlet valves 221, 222, 223, and 224 are independently controlled by the ECU to deliver the hydraulic pressure generated from the hydraulic pressure supply device 100 to the wheel cylinders 40. That is, the first and second inlet valves 221 and 222 are configured to control the hydraulic pressure supplied to the first hydraulic circuit 201, and the third and fourth inlet valves 223 and 224 are configured to control the hydraulic pressure supplied to the second hydraulic circuit 202.

Meanwhile, it has been shown and described that the first balance valve 241 is connected to first and second inlet valves 221 and 222 and the second balance valve 242 is connected to the third and fourth inlet valves 223 and 224, but they are not limited thereto. Alternatively, the first balance valve 241 may be two inlet valves among the first to fourth inlet valves 221, 222, 223, and 224, and the second balance valve 242 may be connected to the remaining two inlet valves. That is, the first balance valve 241 may be connected to the first and third inlet valves 221 and 223, or to the first and fourth inlet valves 221 and 224. It should be understood that such a connection structure between the balance valves 241 and 242 and the inlet valves 221, 222, 223, and 224 may be selectively altered and used according to a demand of a user and a configuration of a system.

The opening and closing operations of each of the first to fourth inlet valves 221, 222, 223, and 224 are independently controlled by the ECU and are configured to deliver the hydraulic pressure generated from the hydraulic pressure supply device 100 to the wheel cylinders 40. That is, the first and second inlet valves 221 and 222 are configured to control the hydraulic pressure supplied to the first hydraulic circuit 201, and the third and fourth inlet valves 223 and 224 are configured to control the hydraulic pressure supplied to the second hydraulic circuit 202.

Also, opening and closing operations of each of the first to fourth dump valves 231, 232, 233, and 234 are independently controlled by the ECU, the first and second dump valves 231 and 232 are configured to control the hydraulic pressure discharged from the wheel cylinders 40 of the first hydraulic circuit 201, and the third and fourth dump valves 233 and 234 are configured to control the hydraulic pressure discharged from the wheel cylinders 40 of the second hydraulic circuit 202.

Figure 2:
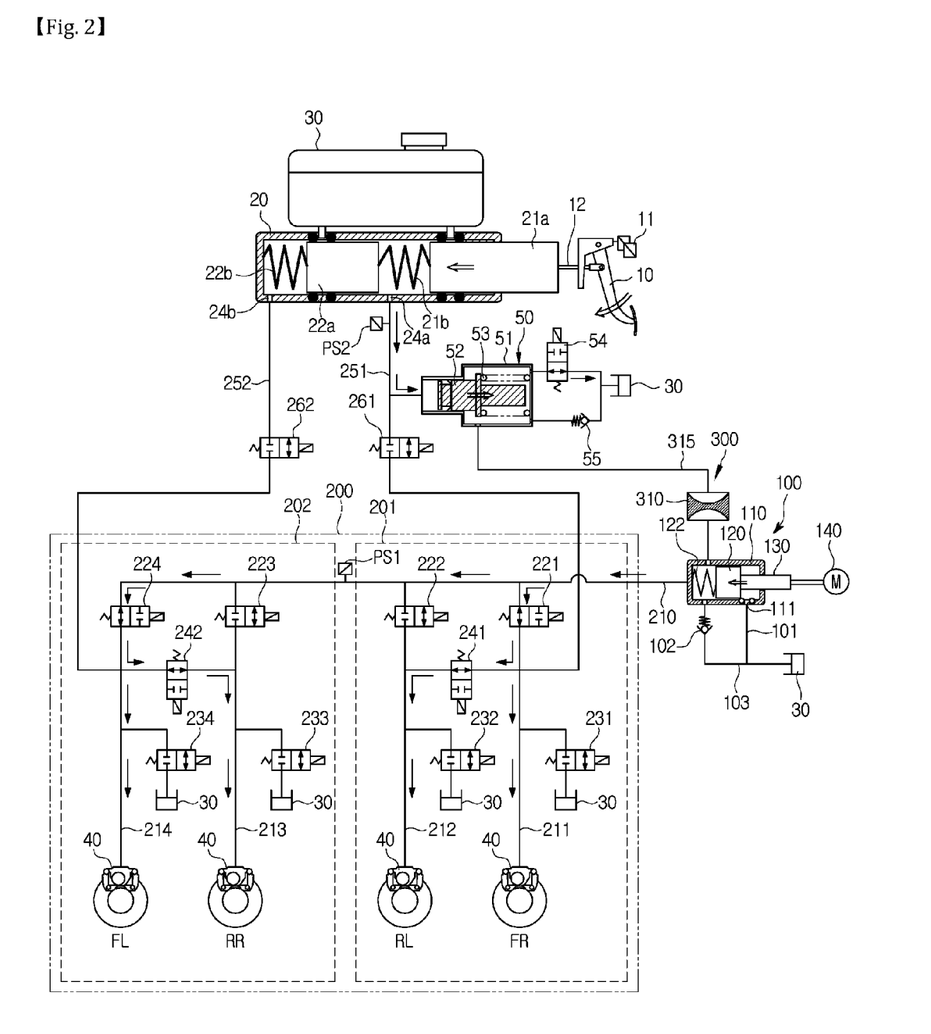
FIG. 2 is a hydraulic circuit diagram illustrating a state in which the electric brake system according to one embodiment of the present disclosure operates normally.

In accordance with one embodiment of the present disclosure, it may be configured that two inlet valves among the four inlet valves 221, 222, 223, and 224 are opened so that the hydraulic pressure is delivered to the wheel cylinder 40 of each of the wheels FR, FL, RR, and RL. For example, as shown in FIG. 2, the first inlet valve 221 of the first and second inlet valves 221 and 222 is opened and the fourth inlet valve 224 of the third and fourth inlet valves 223 and 224 is opened so that the hydraulic pressure is delivered to the wheel cylinder 40 of each of the wheels FR, FL, RR, and RL. That is, the hydraulic pressure passing the first and fourth inlet valves 221 and 224 is delivered to adjacent wheel cylinders 40 through the first and second balance valves 241 and 242. At this point, it is has been shown that the first hydraulic circuit 201 and the second hydraulic circuit 202 open the inlet valves 221 and 224, respectively, to deliver the hydraulic pressure to each of the wheel cylinders 40, but they are not limited thereto. Alternatively, according to a structure of the flow path connection, the two inlet valves 221 and 222 provided in the first hydraulic circuit 201 or the two inlet valves 223 and 224 provided in the second hydraulic circuit 202 may be open to deliver the hydraulic pressure to each of the wheel cylinders 40. Meanwhile, when emergency braking is required, all the inlet valves 221, 222, 223, and 224 may be open to rapidly deliver the hydraulic pressure to the wheel cylinders 40.

Such first to fourth inlet valves 221, 222, 223, and 224 are configured with normally closed type solenoid valves that are usually closed and are open when an opening signal is received.

Also, the first and second balance valves 241 and 242 are configured with normally opened type solenoid valves that are usually open and are closed when a closing signal is received from the ECU, and the first to fourth dump valves 231, 232, 233, and 234 are configured with normally closed type solenoid valves that are usually closed and are open when an opening signal is received.

In accordance with one aspect of the present disclosure, the first and second backup flow paths 251 and 252 are provided to supply oil discharged from the master cylinder 20 to the wheel cylinders 40 when the electric brake system operates abnormally. More particularly, the first cut valve 261 for controlling a flow of the oil is provided at the first backup flow path 251, and the second cut valve 262 for controlling a flow of the oil is provided at the second backup flow path 252. Also, the first backup flow path 251 connects the first hydraulic port 24a to the first hydraulic circuit 201, and the second backup flow path 252 connects the second hydraulic port 24b to the second hydraulic circuit 202. As shown in the drawing, the first backup flow path 251 is connected to the first balance valve 241, which connects the first hydraulic flow path 211 to the second hydraulic flow path 212, and the second backup flow path 252 is connected to the second balance valve 242, which connects the third hydraulic flow path 213 to the fourth hydraulic flow path 214. Operational structures of the first and second cut valves 261 and 262 will be described again below.

The first and second cut valves 261 and 262 are configured with normally opened type solenoid valves that are usually open and are closed when a closing signal is received from the ECU.

Meanwhile, an undescribed reference number 'PS1' is a first pressure sensor which senses the hydraulic pressure of the wheel cylinders 40, and an undescribed reference number 'PS2' is a second pressure sensor which senses the oil pressure of the master cylinder 20.

A pulsation flow path 315 connecting a front end of the first cut valve 261 to the hydraulic pressure chamber 110 is formed to provide a driver with a pressure pulsation generated during an ABS control, and the damping member 300 is provided at the pulsation flow path 315.

For example, one side of the damping member 300 may be connected to the simulation chamber 51, to the first backup flow path 251 of the front end of the first cut valve 261, or to the chamber of the master cylinder 20. That, when the one side of the damping member 300 is connected to the front end of the first cut valve 261, a pulsation of the hydraulic pressure chamber 110 may be delivered to the brake pedal 10.

Also, it has been shown in the drawing that the one side of the damping member 300 is connected a rear end of the reaction force piston 52. Alternatively, it may include that the one side of the damping member 300 is connected to a front end of the reaction force piston 52.

Meanwhile, the pulsation flow path 315 is provided as a closed circuit between the simulation chamber 51 and the hydraulic pressure chamber 110. A structure in which a pressure pulsation is delivered to a driver through such a damping member 300 will be described in detail below in an operation state according to an ABS mode.

Hereinafter, an operation of the electric brake system according to one embodiment of the present disclosure will be described in detail.

FIG. 2 is a hydraulic circuit diagram illustrating a state in which the electric brake system according to one embodiment of the present disclosure operates normally.

Referring to FIG. 2, when a driver begins braking, an amount of braking requested by the driver may be sensed through the pedal displacement sensor 11 on the basis of information including pressure applied to the brake pedal 10 by the driver or the like. The ECU (not shown) receives an electrical signal output from the pedal displacement sensor 11 to operate the motor 140.

Also, the ECU may receive an amount of regenerative braking through the second pressure sensor PS2 provided at an outlet side of the master cylinder 20 and the first pressure sensor PS1 for sensing pressure of each of the wheel cylinders 40, and may calculate an amount of braking friction on the basis of a difference between the amount of braking requested by the driver and the amount of regenerative braking, thereby determining the magnitude of an increase or reduction of pressure at each of the wheel cylinders 40.

In particular, when the driver steps on the brake pedal 10 at an initial stage of braking, the motor 140 is operated, a rotational force of the motor 140 is converted into a rectilinear movement by the power conversion unit 130, the hydraulic piston 120 is moved forward to pressurize the hydraulic pressure chamber 110, thereby generating hydraulic pressure. That is, the hydraulic pressure discharged from the hydraulic pressure chamber 110 is delivered to the wheel cylinders 40 through the first to fourth hydraulic flow paths 211, 212, 213, and 214, each of which is connected to the main hydraulic flow path 210. At this point, the first and second cut valves 261 and 262 installed at the first and second backup flow paths 251 and 252, respectively, which are connected to the first and second hydraulic ports 24a and 24b, respectively, are closed so that the hydraulic pressure generated in the master cylinder 20 is not delivered to the wheel cylinders 40.

In addition, the hydraulic pressure generated from the hydraulic pressure chamber 110 is delivered to the wheel cylinders 40 of the front right wheel FR and the front left wheel FL according to opening of the first and fourth inlet valves 221 and 224 to generate a braking force. At the same time, the hydraulic pressure delivered through the first and fourth inlet valves 221 and 224 is delivered to the wheel cylinders 40 of the rear left wheel RL and the rear right wheel RR through the first and second balance valves 241 and 242 which are open. That is, the hydraulic pressure is supplied to all the wheel cylinders 40 through the opening operation of the two inlet valves 221 and 224 selected among the four inlet valves 221, 222, 223, and 224.

Such an operation is a general braking operation, and, when emergency braking is required, all the inlet valves 221, 222, 223, and 224 may be open to rapidly deliver the hydraulic pressure to the wheel cylinders 40.

Meanwhile, the pressure generated by means of a pressurization of the master cylinder 20 according to the pedal effort of the brake pedal 10 is delivered to the simulation device 50 connected to the master cylinder 20. At this point, the normally closed type simulation valve 54 disposed at the rear end of the simulation chamber 51 is open so that the oil filled in the simulation chamber 51 is delivered to the reservoir 30 through the simulation valve 54. Also, the reaction force piston 52 is moved, and pressure corresponding to a reaction force of the reaction force spring 53 supporting the reaction force piston 52 is generated inside the simulation chamber 51 to provide an appropriate pedal feeling to the driver.

Figure 3:
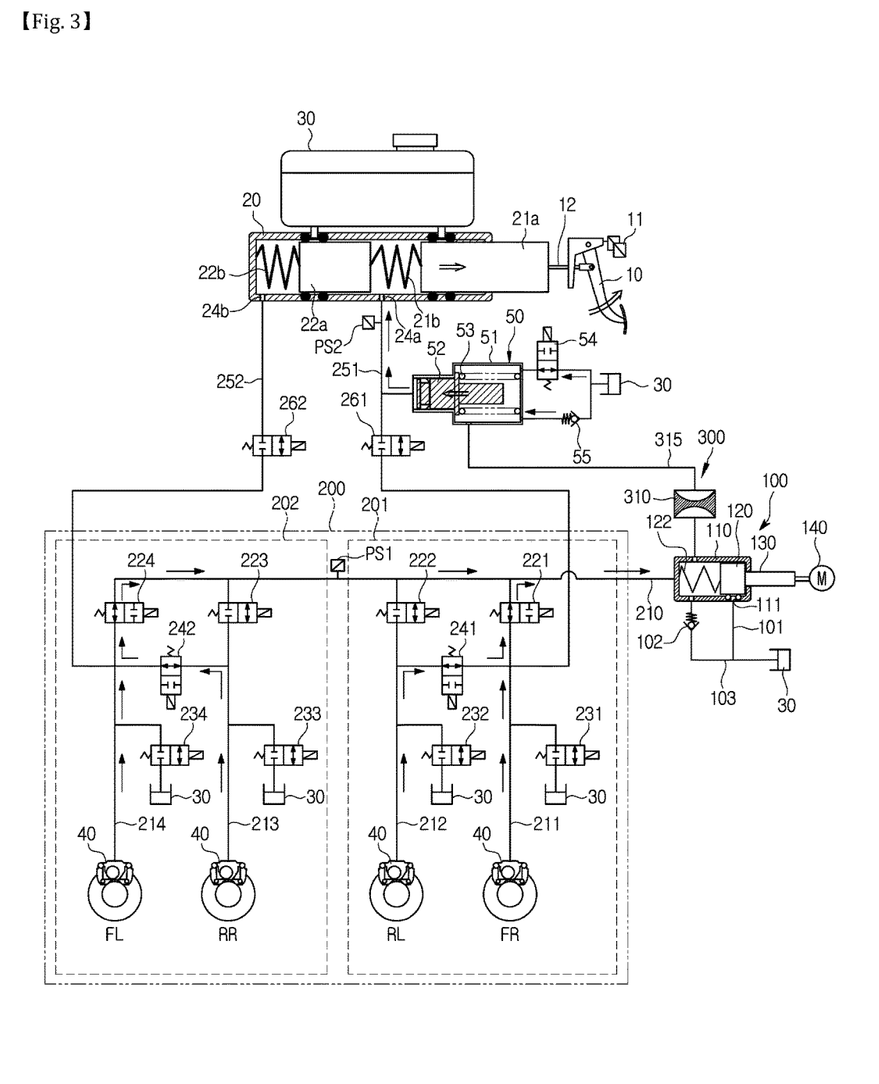
FIG. 3 is a hydraulic circuit diagram illustrating a case of releasing the braking force in a braking state established when the electric brake system operates normally.

Next, a case of releasing the braking force in a braking state established when the electric brake system operates normally as described above will be described with reference to FIG. 3. As shown in FIG. 3, when a pedal effort applied to the brake pedal 10 is released, the motor 140 generates a rotational force in a reverse direction compared to that when the hydraulic piston 120 is moved forward to move backward and return the hydraulic piston 120 to its original position. At this point, opening and closing operational states of the first to fourth inlet valves 221, 222, 223, and 224, the first to fourth dump valves 231, 232, 233, and 234, and the first and second balance valves 241 and 242 are controlled the same way as they are in the braking operation. That is, the first to fourth dump valves 231, 232, 233, and 234 and the second and third inlet valves 222 and 223 are closed, whereas the first and fourth inlet valves 221 and 224 are open. As a result, the hydraulic pressure discharged from the wheel cylinders 40 of the first hydraulic circuit 201 is delivered inside the hydraulic pressure chamber 110 through the first balance valve 241 and the first inlet valve 221, and the hydraulic pressure discharged from the wheel cylinders 40 of the second hydraulic circuit 202 is delivered inside the hydraulic pressure chamber 110 through the second balance valve 242 and the fourth inlet valve 224.

In the simulation device 50, the oil inside the simulation chamber 51 is delivered to the master cylinder 20 according to the return of the reaction force piston 52 to its original position by the reaction force spring 53, and the oil is refilled inside the simulation chamber 51 through the simulation valve 54 and the simulation check valve 55 which are connected to the reservoir 30 to ensure a rapid return of pressure of the pedal simulator.

Meanwhile, when the hydraulic piston 120 is moved through the hydraulic pressure supply device 100 of the electric brake system, a flow of the oil inside the hydraulic pressure chamber 110 is controlled through the oil flow path 103 and the connection flow path 101 which are connected to the reservoir 30.

Meanwhile, the electric brake system according to one embodiment of the present disclosure may control the valves 221, 222, 223, 224, 231, 232, 233, 234, 241, and 242 provided at the hydraulic control unit 200 according to pressure required for the wheel cylinder 40 provided at each of the wheels RR, RL, FR, and FL of the two hydraulic circuits 201 and 202, thereby specifying and controlling a control range. For example, FIG. 4 shows a case of braking only a corresponding wheel cylinder while the ABS is operated, and a state of braking only the left wheels FL and RL is illustrated.

Figure 4:
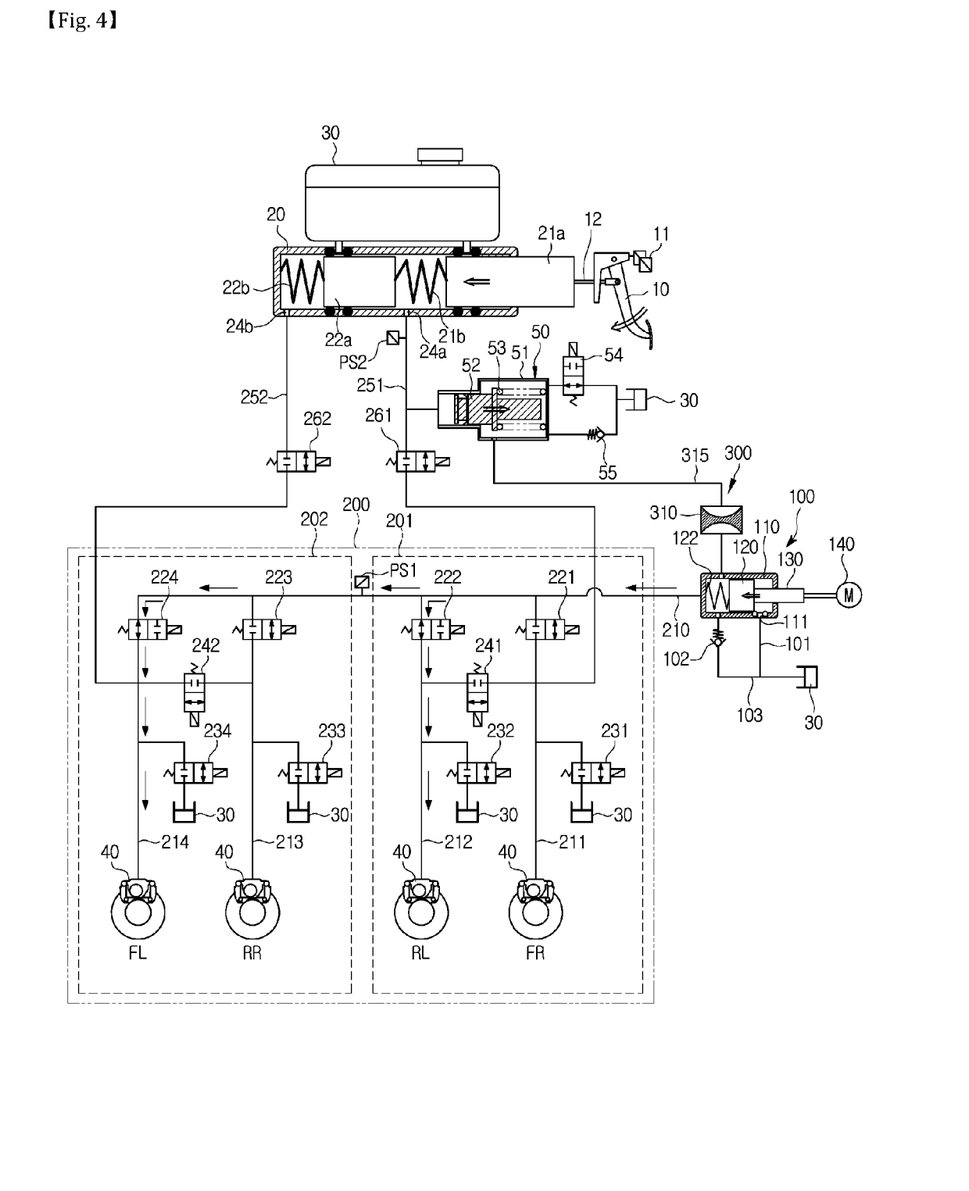
FIG. 4 and FIG. 5 are hydraulic circuit diagrams illustrating a case of braking only a corresponding wheel cylinder while the ABS is operated.

Referring to FIG. 4, the motor 140 is operated according to a pedal effort of the brake pedal 10, a rotational force of the motor 140 is converted into a rectilinear movement, and the hydraulic piston 120 is moved forward to pressurize the hydraulic pressure chamber 110, thereby generating hydraulic pressure. At this point, the first and second cut valves 261 and 262 are closed and thus the hydraulic pressure generated in the master cylinder 20 is not delivered to the wheel cylinders 40. Also, the first and third inlet valves 221 and 223, the first to fourth dump valves 231, 232, 233, and 234, and the first and second balance valves 241 and 242 are controlled to be closed. Consequently, the hydraulic pressure generated from the hydraulic pressure chamber 110 is delivered to the wheel cylinder 40 of the rear left wheel RL through the second inlet valve 222, and to the wheel cylinder 40 of the front left wheel FL through the fourth inlet valve 224. Therefore, the hydraulic pressure is delivered to only the left wheels RL and FL among the wheels RL, RR, FL, and FR.

In accordance with one aspect of the present disclosure, the operations of the first to fourth inlet valves 221, 222, 223, and 224, the first to fourth dump valves 231, 232, 233, and 234, and the first and second balance valves 241 and 242 may be independently controlled as described above so that the hydraulic pressure may be delivered to only the rear wheels RR and RL, or may be delivered to the wheel cylinders 40 of the front right wheel FR and the rear right wheel RR or the front right wheel FR and the rear left wheel RL, which require the hydraulic pressure.

Meanwhile, when the hydraulic pressure is delivered to only the left wheels RL and FL according to sliding of a vehicle as described above, the pressure pulsation is generated according to the opening operations of the second and fourth inlet valves 222 and 224. At this point, since the first and second cut valves 261 and 262 are provided in a closed state, the pressure pulsation is not delivered to the master cylinder 20 through the first and second backup flow paths 251 and 252 respectively connected to the first and second balance valves 241 and 242. Consequently, the pressure pulsation is delivered to the hydraulic pressure chamber 110 through the main hydraulic flow path 210 connected to the second and fourth hydraulic flow paths 212 and 214. More particularly, a flow in which the pressure pulsation is delivered will be described with reference to FIG. 5.

Figure 5:
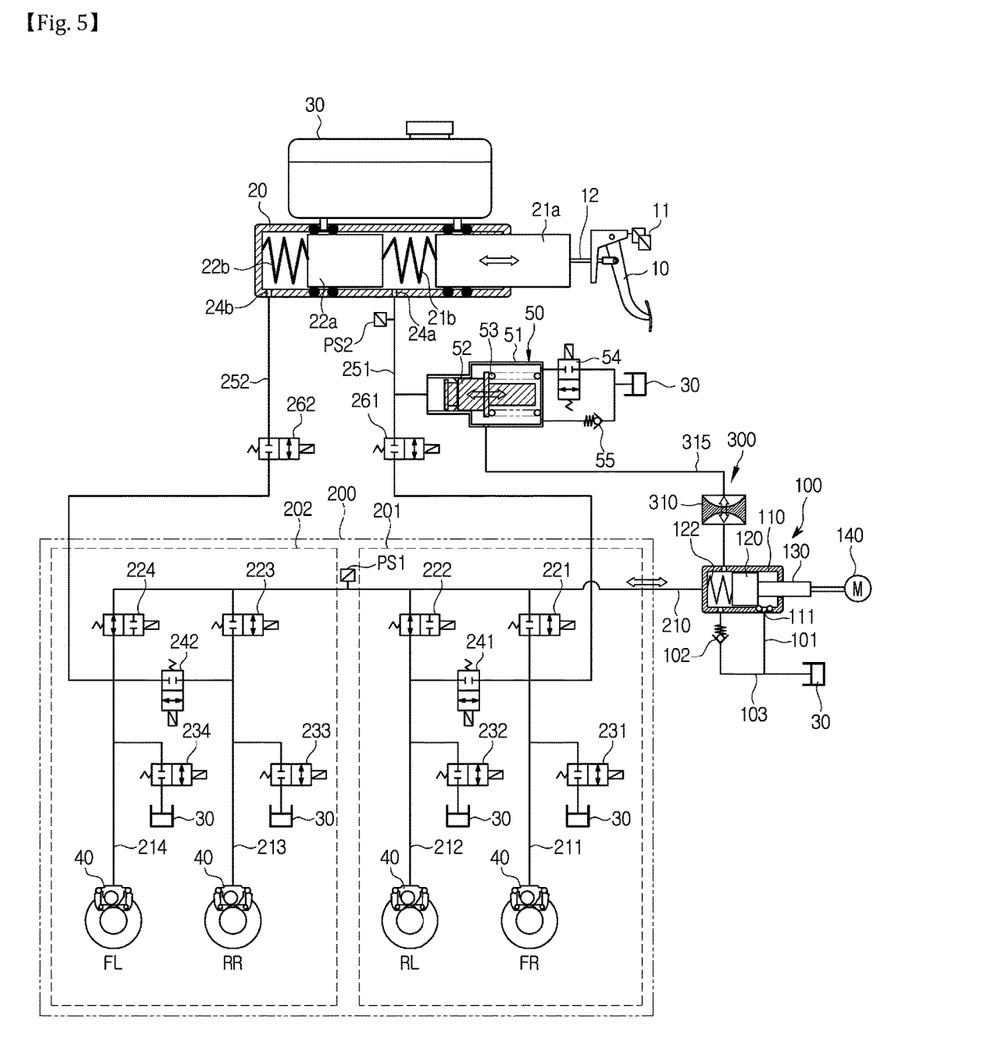

As described above, the pressure pulsation generated in an ABS mode is delivered to the hydraulic pressure chamber 110 through the main hydraulic flow path 210. At this point, an arrow shown in FIG. 5 is indicative of a portion at which the pressure pulsation is delivered. Such a pressure pulsation is delivered to the damping member 300 through the hydraulic pressure chamber 110. At this point, a damper 310 provided at the damping member 300 is moved, and thus the pressure pulsation is delivered to the simulation chamber 51 through the pulsation flow path 315 connecting the hydraulic pressure chamber 110 and the simulation chamber 51. Since the pulsation flow path 315 is provided as a closed circuit between the simulation chamber 51 and the hydraulic pressure chamber 110, the pressure pulsation may be easily delivered to the simulation chamber 51. More particularly, the pressure pulsation causes tens or hundreds of waves per second and thus the damper 310 is elastically deformed and a volume inside the damping member 300 is varied. Consequently, according to a variance in volume, the hydraulic pressure inside the pulsation flow path 315 repetitively flows in and is discharged between the simulation chamber 51 and the damping member 300. Therefore, the reaction force piston 52 inside the simulation chamber 51 is moved according to a flow of the oil and thus the pressure pulsation is delivered to the master cylinder 20. That is, the pressure pulsation is delivered to a driver through the brake pedal 10 connected to the first piston 21*a* of the master cylinder 20.

Meanwhile, it has been shown that the simulation valve 54 is switched from the open state to the closed state in an ABS mode control, but this is merely one example, and the pressure pulsation may be delivered even when the simulation valve 54 is provided in the open state.

Also, the electric brake system according to one aspect of the present disclosure may discharge braking pressure of a corresponding wheel cylinder 40, which was supplied thereto, through the first to fourth dump valves 231, 232, 233, and 234. For example, FIG. 6 shows a case in which the electric brake system operates in a dump mode to discharge the hydraulic pressure of the corresponding wheel cylinder 40, and a state in which the left wheel RL and FL are dumped is illustrated.

Figure 6:
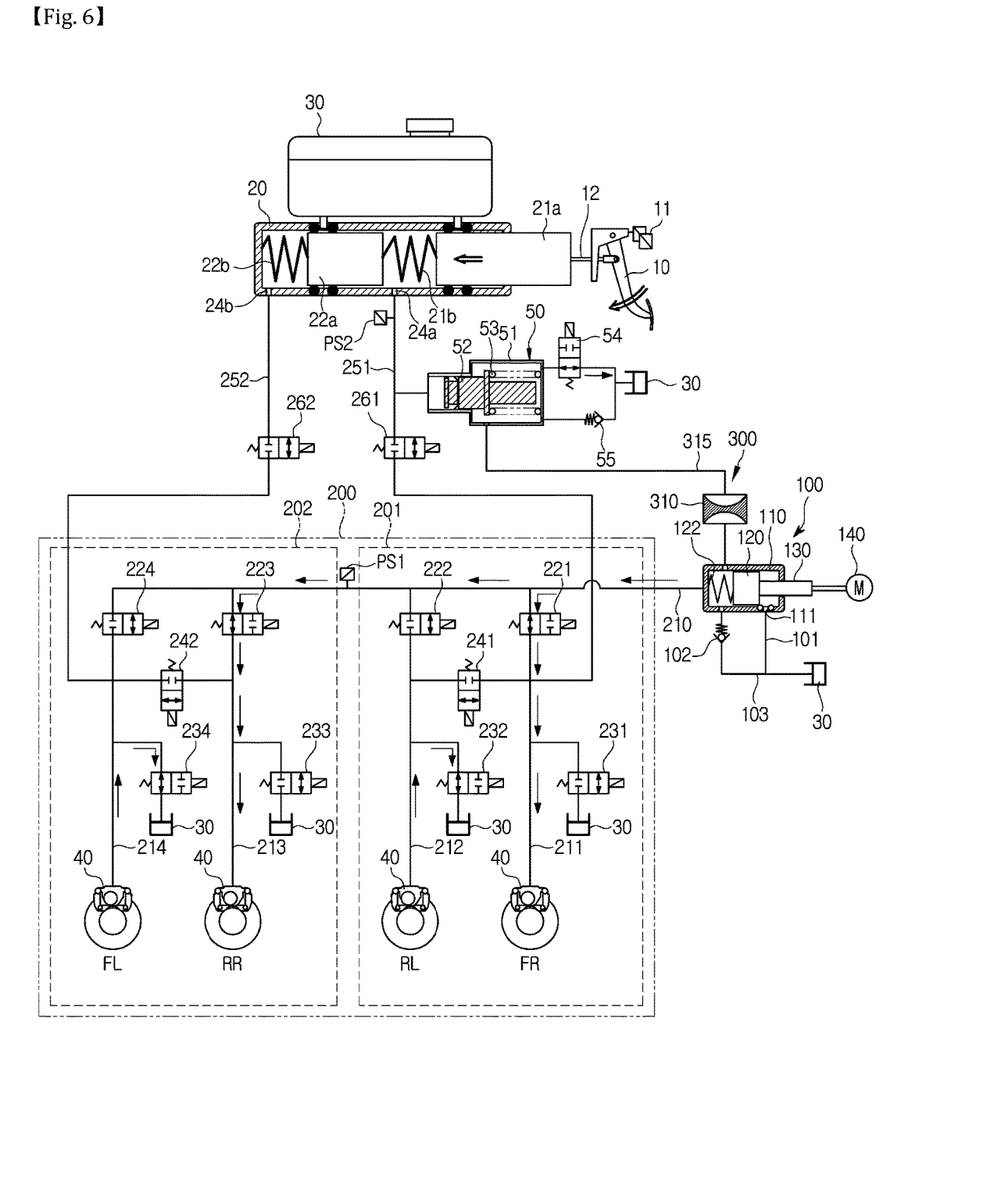
FIG. 6 is a hydraulic circuit diagram illustrating a case in which the electric brake system operates in a dump mode to discharge the hydraulic pressure of the corresponding wheel cylinder.

Referring to FIG. 6, the second and fourth inlet valves 222 and 224, the first and third dump valves 231 and 233, and the first and second balance valves 241 and 242 are controlled in a closed state, and the second and fourth dump valves 232 and 234 are open. As a result, the hydraulic pressure, which is discharged from the wheel cylinders 40 installed at the rear left wheel RL and the front left wheel FL, is delivered to the reservoirs 30 through the second and fourth dump valves 232 and 234.

At this point, in addition to the dump mode in which the second and fourth dump valves 232 and 234 are open to discharge the hydraulic pressure of the corresponding wheel cylinders 40, the first and third inlet valves 221 and 223 may be open to supply the hydraulic pressure to the front right wheel FR and the rear right wheel RR.

As described above, each of valves 221, 222, 223, 224, 231, 232, 233, 234, 241, and 242 of the hydraulic control unit 200 may be independently controlled to selectively deliver or discharge the hydraulic pressure to and from the wheel cylinder 40 of each of the wheels RL, RR, FL, and FR according to a required pressure so that a precise control of hydraulic pressure may be possible.

Figure 7:
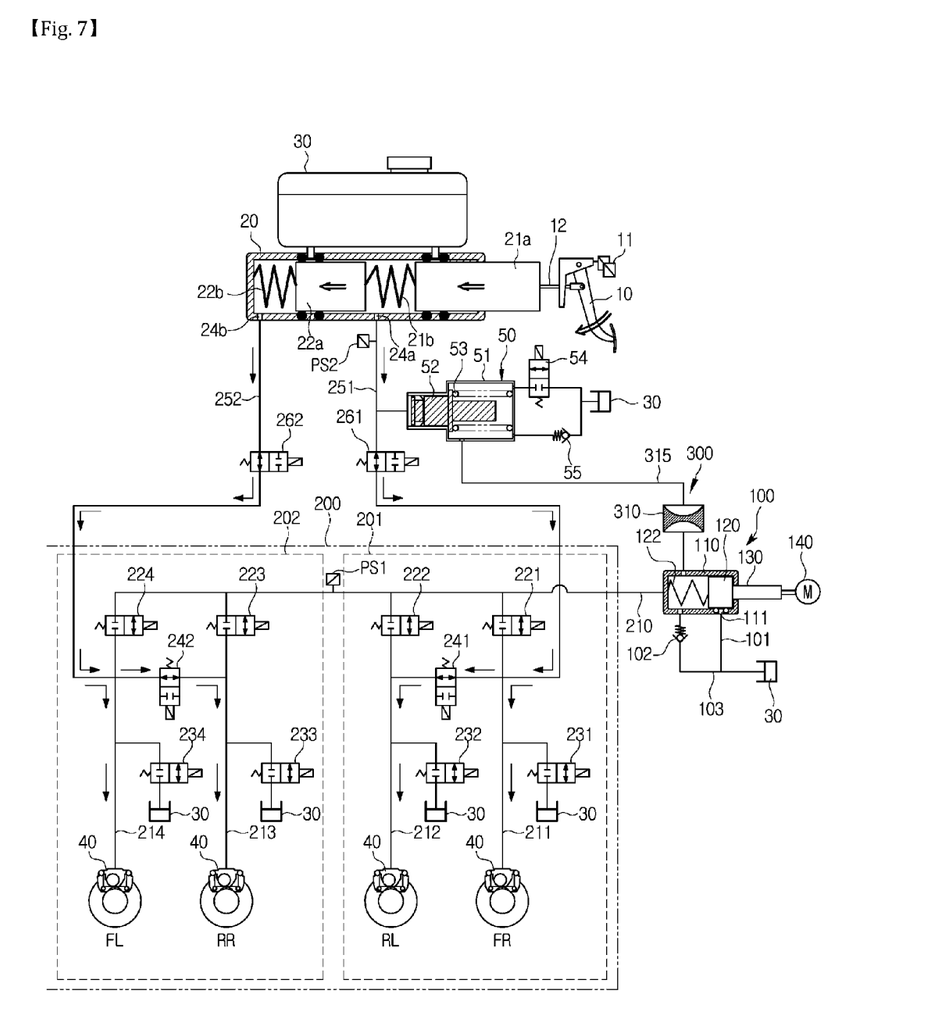
FIG. 7 is a hydraulic circuit diagram illustrating a case in which the electric brake system operates abnormally.

Lastly, a case in which the electric brake system operates abnormally will be described. Referring to FIG. 7, when the electric brake system operates abnormally, each of the valves 54, 221, 222, 223, 224, 231, 232, 233, 234, 241, 242, 261, and 262 is provided in an initial state of braking, that is, a non-operating state. When a driver pressurizes the brake pedal 10, the input rod 12 connected to the brake pedal 10 is moved in a left direction, and at the same time the first piston 21*a*, which comes in contact with the input rod 12, is moved in the left direction and also the second piston 22*a* is moved in the left direction by the first piston 21*a*. At this point, since there is no gap between the input rod 12 and the first piston 21*a*, the braking may be rapidly performed. That is, the hydraulic pressure generated by a pressurization of the master cylinder 20 is delivered to the wheel cylinders 40 through the first and second backup flow paths 251 and 252 which are connected for the purpose of braking in a backup mode to realize a braking force. At this point, the first and second cut valves 261 and 262 respectively installed at the first and second backup flow paths 251 and 252 and the first and second balance valves 241 and 242 respectively installed at the first and second backup flow paths 251 and 252 are configured with normally opened type solenoid valves, and the simulation valve 54, the first to fourth inlet valves 221, 222, 223, and 224, and the first to fourth dump valves 231, 232, 233, and 234 are configured with normally closed type solenoid valves so that the hydraulic pressure is directly delivered to the wheel cylinders 40. Therefore, stable braking may be performed to improve braking safety.

As is apparent from the above description, the electric brake system according to one embodiment of the present disclosure provides with a damping member installed at a flow path connecting a simulation device providing a driver with a pedal effort to a hydraulic pressure supply device generating hydraulic pressure, and delivers a pressure pulsation generated during an ABS control to the driver through the damping member so that a demand of the driver may be satisfied.

Also, a connection structure of the damping member is simplified so that the damping member may be installed without increasing a size of a modulator block configuring the electric brake system.

Further, a motor and valves are interlocked and controlled with each other so that there is an effect in which a precise control of pressure may be possible. In addition, two hydraulic circuits are respectively configured to be connected to two wheels and are independently controlled, and the hydraulic pressure supply device is interlocked and controlled with the two hydraulic circuits according to pressure required for each wheel and a priority determination logic so that there is an advantage in which a control rage may be increased.

Moreover, when the electric brake system fails, the pedal effort of the driver may be directly delivered to the master cylinder to enable braking of a vehicle so that a stable braking force may be provided.

As described above, although the present disclosure has been described by way of a specific embodiment and the accompanying drawings, it is not limited thereto, and it should be understood that numerous other changes and modifications can be devised by those skilled in the art that will fall within the spirit and scope of this disclosure and along with the full range of equivalents to which the appended claims are entitled.

[Description of Reference Numerals]

| | |
|---|---|
| 10: Brake pedal | 11: Pedal displacement sensor |
| 20: Master cylinder | 30: Reservoir |
| 40: Caliper brake | 50: Simulation device |
| 54: Simulation valve | 100: Hydraulic pressure supply device |
| 110: Hydraulic pressure chamber | 120: hydraulic piston |
| 130: Power conversion unit | 140: Motor |
| 200: Hydraulic control unit | 201: First hydraulic circuit |
| 202: Second hydraulic circuit | 210: Main hydraulic flow path |
| 221: First inlet valve | 222: Second inlet valve |
| 223: Third inlet valve | 224: Fourth inlet valve |
| 231: First dump valve | 232: Second dump valve |
| 233: Third dump valve | 244: Fourth dump valve |
| 241: First balance valve | 242: Second balance valve |
| 251: First backup flow path | 252: Second backup flow path |
| 261: First cut valve | 262: Second cut valve |
| 300: Damping member | 315: Pulsation flow path |

What is claimed is:

1. An electric brake system comprising:
   a master cylinder configured to a reservoir storing oil therein and configured to generate hydraulic pressure according to a pedal effort of a brake pedal;
   at least one cut valve installed at a backup flow path connecting the master cylinder to a wheel cylinder;
   a simulation device including a simulation chamber connected to the master cylinder at a front end of the at least one cut valve to provide a reaction force according to the pedal effort of the brake pedal and configured to store the oil therein, and a simulation valve provided at a flow path connecting the master cylinder to the simulation chamber, or connecting the simulation chamber to the reservoir;
   a hydraulic pressure supply device configured to operate in response to an electrical signal of a pedal displacement sensor sensing a displacement of the brake pedal, and deliver hydraulic pressure, which is generated by pressurizing a hydraulic pressure chamber connected to the reservoir to store oil, to the wheel cylinder; and
   a damping member provided at a flow path connecting the hydraulic pressure chamber to the front end of the at least one cut valve, the damping member comprising a damper configured to be moved in response to the hydraulic pressure,
   wherein the simulation valve and a simulation check valve are provided in parallel at a flow path to which a rear end part of the simulation chamber of the simulation device and the reservoir are connected.

2. The electric brake system of claim 1, wherein one side of the damping member is connected to the hydraulic pressure chamber, and the other side thereof is connected to the simulation chamber.

3. The electric brake system of claim 1, further comprising:
   a hydraulic control unit including first and second hydraulic circuits connected to the hydraulic pressure supply device through a flow path and configured to receive hydraulic pressure discharged from the hydraulic pressure supply device to control a flow of the hydraulic pressure being delivered to the wheel cylinder provided at each of wheels; and
   an electronic control unit configured to control the motor and valves on the basis of hydraulic pressure information and displacement information of the brake pedal,
   wherein the master cylinder has a first hydraulic port connected to the first hydraulic circuit, and a second hydraulic port connected to the second hydraulic circuit, and
   wherein the hydraulic pressure supply device is configured such that the motor is operated in response to the electrical signal output from the pedal displacement sensor and the hydraulic pressure is generated by converting a rotational force of the motor into a rectilinear movement.

4. An electric brake system comprising:
   a master cylinder configured to a reservoir storing oil therein and configured to generate hydraulic pressure according to a pedal effort of a brake pedal;
   at least one cut valve installed at a backup flow path connecting the master cylinder to a wheel cylinder;
   a simulation device including a simulation chamber connected to the master cylinder at a front end of the at least one cut valve to provide a reaction force according to the pedal effort of the brake pedal and configured to store the oil therein, and a simulation valve provided at a flow path connecting the master cylinder to the simulation chamber, or connecting the simulation chamber to the reservoir;
   a hydraulic pressure supply device configured to operate in response to an electrical signal of a pedal displacement sensor sensing a displacement of the brake pedal, and deliver hydraulic pressure, which is generated by pressurizing a hydraulic pressure chamber connected to the reservoir to store oil, to the wheel cylinder; and
   a damping member provided at a flow path connecting the hydraulic pressure chamber to the front end of the at least one cut valve, wherein the simulation valve and a simulation check valve are provided in parallel at a flow path to which a rear end part of the simulation chamber of the simulation device and the reservoir are connected.

5. The electric brake system of claim 4, wherein one side of the damping member is connected to the hydraulic pressure chamber, and the other side thereof is connected to the simulation chamber.

6. The electric brake system of claim 4, wherein the simulation valve is provided to open a flow path connecting the simulation chamber to the reservoir in a normal mode, and to close the flow path connecting the simulation chamber to the reservoir in an abnormal mode, and is selectively open or closed in the ABS mode to deliver a required pressure pulsation.

7. The electric brake system of claim 4, wherein the hydraulic pressure supply device includes:
a motor configured to generate a rotational force in response to the electrical signal of the pedal displacement sensor;
a power conversion unit configured to convert the rotational force of the motor into a rectilinear movement;
a hydraulic piston connected to the power conversion unit and configured to perform a rectilinear movement;
a hydraulic pressure chamber provided to slide the hydraulic piston therein and connected to the first and second hydraulic circuits though the hydraulic flow path; and
a hydraulic spring provided inside the hydraulic pressure chamber and configured to elastically support the hydraulic piston,
wherein the hydraulic pressure chamber is configured to be connected to the reservoir through an oil port and to receive the oil.

8. The electric brake system of claim 7, wherein a communicating hole is formed to be connected to the reservoir at an outlet side of the hydraulic pressure chamber, and a check valve provided at a flow path connected to the communicating hole and the reservoir and configured to allow the oil to flow from the reservoir to the hydraulic pressure chamber and block the oil from flowing from the hydraulic pressure chamber to the reservoir.

9. The electric brake system of claim 4, wherein the simulation valve is configured with a normally closed solenoid valve that is usually closed and is open when an opening signal is received.

10. The electric brake system of claim 4, wherein the damping member delivers a pressure pulsation generated in the hydraulic pressure chamber to the brake pedal in an anti-lock brake system (ABS) mode.

11. The electric brake system of claim 4, wherein the damper is configured to be deformed to vary a volume inside the damping member.

12. The electric brake system of claim 4, further comprising:
a hydraulic control unit including first and second hydraulic circuits connected to the hydraulic pressure supply device through a flow path and configured to receive hydraulic pressure discharged from the hydraulic pressure supply device to control a flow of the hydraulic pressure being delivered to the wheel cylinder provided at each of wheels; and
an electronic control unit configured to control the motor and valves on the basis of hydraulic pressure information and displacement information of the brake pedal, wherein the master cylinder has a first hydraulic port connected to the first hydraulic circuit, and a second hydraulic port connected to the second hydraulic circuit, and
wherein the hydraulic pressure supply device is configured such that the motor is operated in response to the electrical signal output from the pedal displacement sensor and the hydraulic pressure is generated by converting a rotational force of the motor into a rectilinear movement.

13. The electric brake system of claim 12, wherein the hydraulic control unit includes:
first to fourth inlet valves respectively provided at an upstream side of the wheel cylinder and configured to control the hydraulic pressure flowing to the wheel cylinder installed at each of the wheels;
first to fourth dump valves configured to respectively control a flow of hydraulic pressure discharged from the wheel cylinder; and
first and second balance valves respectively disposed between the first to fourth inlet valves and first to fourth dump valves, wherein the first balance valve is connected to two inlet valves among the first to fourth inlet valves and the second balance valve is connected to the remaining two inlet valves.

14. The electric brake system of claim 13, wherein one of the two inlet valves connected to each other through the first balance valve and one of the two inlet valves connected to each other through the second balance valve are open so that the hydraulic pressure is delivered to the wheel cylinder installed at each of the wheels.

15. The electric brake system of claim 13, wherein the first to fourth inlet valves are configured with normally closed solenoid valves that are usually closed and are open when an opening signal is received.

16. The electric brake system of claim 13, wherein the first to fourth dump valves are configured with normally closed solenoid valves that are usually closed and are open when an opening signal is received.

17. The electric brake system of claim 13, wherein the first and second balance valves are configured with normally opened solenoid valves that are usually open and are closed when a closing signal is received from the electronic control unit.

18. The electric brake system of claim 13, further comprising:
a first backup flow path configured to connect the first hydraulic port to the first balance valve so as to directly supply oil to the wheel cylinder when the electric brake system operates abnormally;
a second backup flow path configured to connect the second hydraulic port to the second balance valve,
wherein the at least one cut valve comprises:
a first cut valve provided at the first backup flow path and configured to control a flow of the oil; and
a second cut valve provided at the second backup flow path and configured to control a flow of the oil.

19. The electric brake system of claim 18, wherein the first and second cut valves are configured with normally opened solenoid valves that are usually open and are closed when a closing signal is received from the electronic control unit.

* * * * *